Nov. 13, 1928.  
A. A. SCARLETT  
1,691,587  
TANDEM DISK HARROW  
Filed July 16, 1923  3 Sheets-Sheet 3
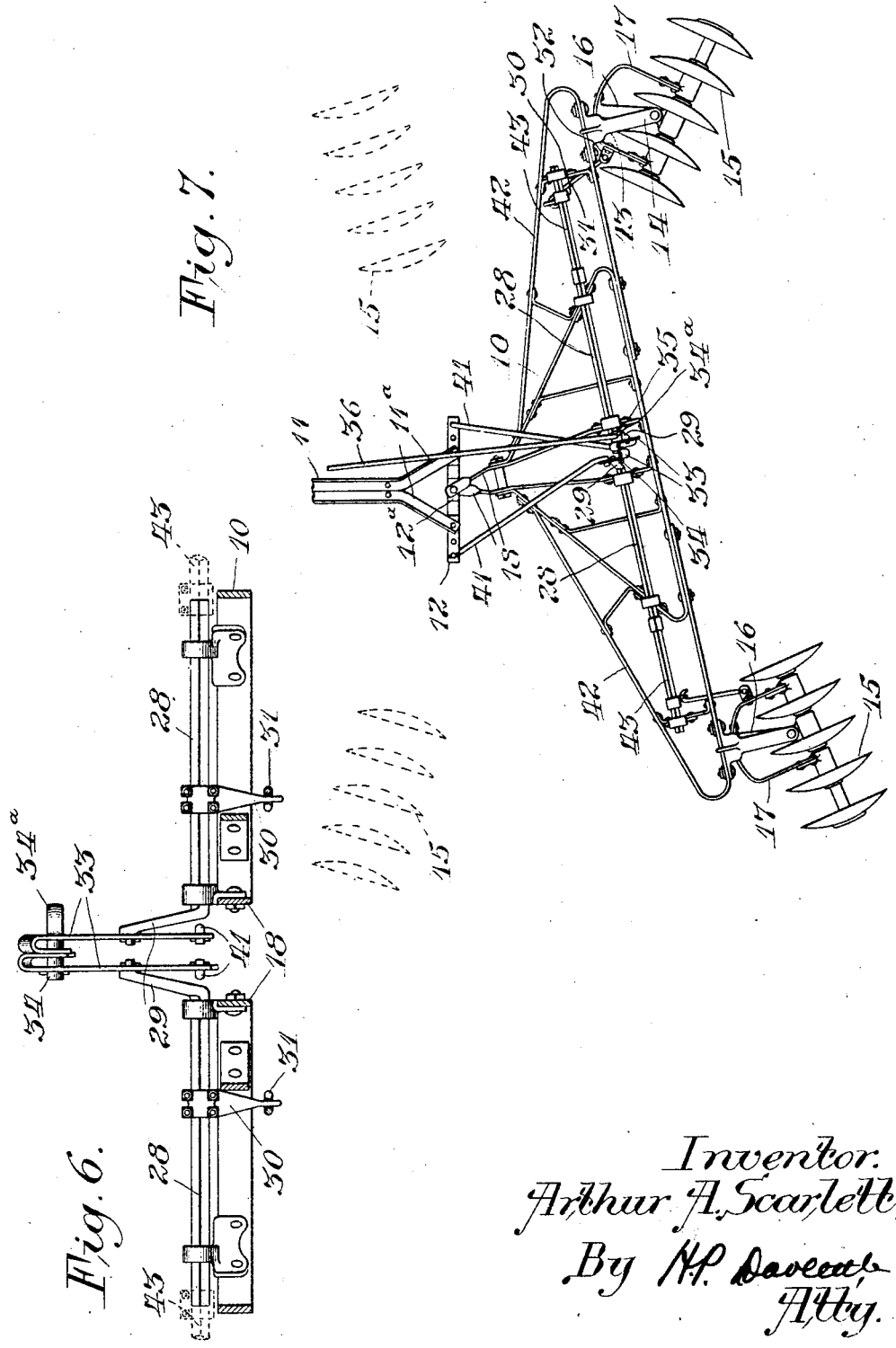
Inventor.  
Arthur A. Scarlett,  
By N.P. Davecat  
Atty.

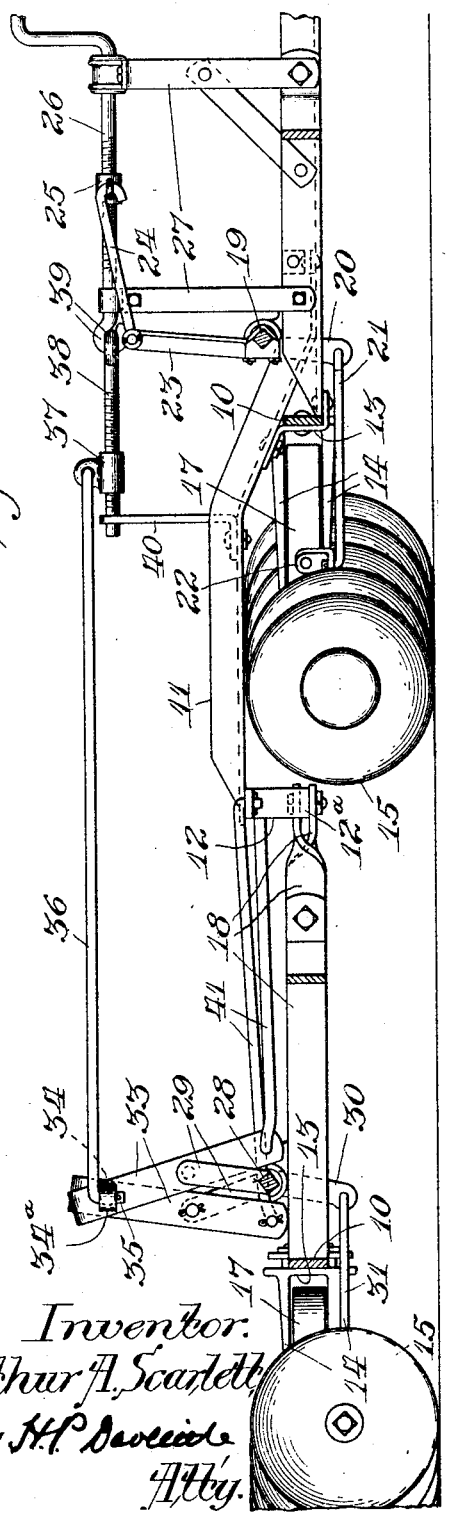

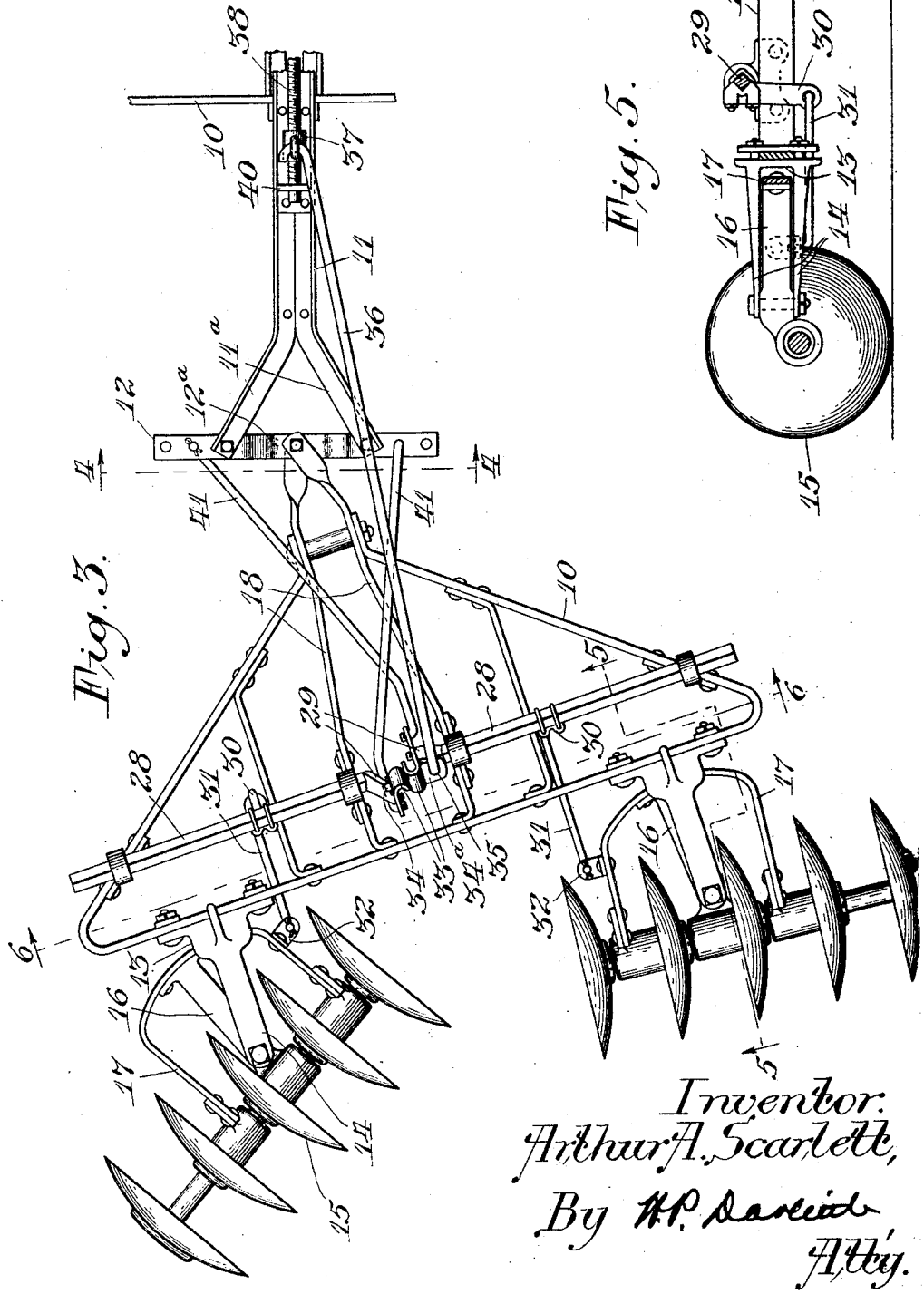

Patented Nov. 13, 1928.

1,691,587

UNITED STATES PATENT OFFICE.

ARTHUR ALFRED SCARLETT, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY.

TANDEM-DISK HARROW.

Application filed July 16, 1923. Serial No. 651,747.

My invention relates to improvements in double disk harrows of the type having flexibly connected frames arranged in tandem and each carrying pivotally mounted disk gangs.

In harrows of this type, the rear section will not follow in the path of the front section on a short turn and also tends to sway laterally during operation and the purpose of this invention is to incorporate a compensating device in the connections between the two sections that will have the effect of keeping the rear section in proper trailing relation to the front section and prevent "cutting in" of the rear section when short turns are made and that will not interfere with the angling mechanism for the gangs nor with pivotal movement between the sections. To accomplish this there has been provided a novel construction and arrangement of links extending from fixed points on the frame of the front section to the angling devices for the respective gangs of the rear section, the arrangement being such that any lateral movement of the rear section will cause the angle of its disk gangs to be altered in a manner tending to return and keep the rear section to true trailing relation with the front section.

The invention accordingly resides in the novel organization and details of construction, or the equivalents thereof, set forth in the following detailed description and defined in the claims.

Referring to the drawings—

Fig. 1 is a plan view of a harrow embodying the invention;

Fig. 2 is a central longitudinal section through the harrow on an enlarged scale;

Fig. 3 is an enlarged plan view of the rear section showing the operation of the device during lateral movement of the section;

Fig. 4 is a detail sectional view on the line 4—4 of Fig. 3;

Fig. 5 is a similar view on the line 5—5 of Fig. 3;

Fig. 6 is a transverse section on the line 6—6 of Fig. 3; and

Fig. 7 is a plan view of the rear section during a turn showing a modified arrangement of the compensating device and gangs, the position of the front gangs being indicated in dotted lines.

This invention is especially applicable to tandem harrows designed for orchard and vineyard use where it is necessary to make short turns around trees and at the end of rows of grape vines where it is desirable that the rear section does not cut in on the front section but follows the path taken by it, thereby avoiding the trees and vines. The invention has, therefore, been illustrated in connection with an orchard disk harrow comprising a front section having a triangular frame 10 which has secured to it a pair of central longitudinally extending angle bars 11 which form the draft tongue and which are extended rearwardly and their ends spread apart as at 11ª (Fig. 3). These spread ends have secured to them the transverse draft bar 12. At each side of the central members 11, bracket members 13 are secured to the rear bar of the frame 10 and between the spaced rearwardly extending arms 14 of these brackets, the disk gangs 15 are pivotally mounted. The gangs are preferably provided with frames comprising forwardly extending arms 16 and arched members 17 which are positioned between the arms 14 and serve to guide and brace the gangs during adjustment and operation. The construction of the rear section is essentially the same as above described and includes the triangular frame 10, brackets 14, gangs 15 and arms and members 16, 17 arranged as in the front section, but instead of the central members 11 of the front frame, the rear frame is formed with forwardly converging bars 18, the forward ends of which are brought together and pivoted to the depressed portion 12ª of the draft bar 12 on the median line of the front section (Fig. 4). The angling mechanism for the front section comprises a rock shaft 19 which has secured thereto a pair of depending arms 20 connected by links 21 to pivot ears 22 on the inner sides of the arches 17, and with a fixed upright arm 23 connected by a link 24 to a threaded sleeve 25 carried on a cranked screw rod 26 which is journaled in uprights 27 on the angle members 11.

On the rear section, the angling mechanism is modified to include a compensating device and comprises a pair of axially aligned rock shafts 28 provided with upper and lower arms 29 and 30. Each of the lower arms 30 is connected by a link 31 to the pivot ears 32 on the inner side of the arch 17 near the inner end of the disk gang and each of the upper arms 29, which are positioned side by side, has pivoted to it a compensating lever 33 which is pivoted intermediate its ends to the end of the arm 29, the two upper ends of the levers 33 being pivotally connected by a pin 34. The pin 34 is provided with an eye 34ª on one end and this eye receives the hooked end 35 of an adjusting rod 36 that extends forwardly and is connected to a screw sleeve 37 on a screw rod 38 which forms an extension of the cranked screw rod 26 and may be integral therewith or flexibly connected thereto as by the interlocked eyes 39. A standard 40 is provided as a support for the end of the screw rod 38. At their lower ends, each of the compensating levers 33 is provided with an aperture receiving the hooked end of a compensating link 41 which extends diagonally forward and is connected in one of the apertures in the outer end of the draft bar 12. In the preferred form of my invention, these compensating links 41 cross over each other near their rear ends and their forward ends are thus spaced laterally and connected pivotally at fixed points on the ends of bar 12 on opposite sides of the flexible coupling between the two sections of the harrow.

In Fig. 7, a modified arrangement is shown in which the central frame 10 of the rear section has extension frames 42 and shaft extensions 43 connected to it to produce a wide type of the machine. When this is done, it has been found preferable not to cross the compensating links 41 as the change in the position of the disk gangs requires a different action of the compensating device as will hereinafter be explained. In this modification, therefore, the links 41 on each side are connected to the compensating lever 33 on the same side of the harrow, the relation of elements otherwise remaining as above disclosed.

It is clear from the above description that operation of the cranked screw rod 26 will cause the sleeves 25 and 37, which have right and left threads respectively, to travel toward and from each other on the screw rods, thereby rocking the shaft 19 on the front section and the two shafts 28 on the rear section in opposite directions and causing the gangs to be either angled or straightened as desired. It is also clear that owing to the action of the compensating levers 33 and links 41, any pivotal movement between the harrow sections will cause rotation of the two shafts 28 in opposite directions thereby reversing the movement between the links 41 and the gangs, and causing the gangs on the rear section to be correspondingly moved or angled in such a manner as to steer the rear section toward the path of the front section, as clearly shown in Fig. 3. When the disk gangs on the rear section are set far apart, as in Fig. 7 however, it is not so much a matter of steering the rear section back to the path of the front section as of relieving the load on one side and increasing it on the other to bring the rear section back to correct position. For this reason, the compensating links are not crossed and are attached in the end holes of the draft bar 12 and consequently upon pivotal action between the sections, as in Fig. 7, the angle of the gang on the right side is increased and that of the gang on the left side decreased, thereby relieving the load on the left side and increasing it on the right side and tending to bring the two sections of the harrow into alignment.

The above description exemplifies the preferred forms of my invention but modifications thereof may obviously be made within the scope of the following claims.

I claim as my invention:

1. In a disk harrow having front and rear flexibly connected frames and a disk gang pivoted on the rear frame, the combination with the frame and gang of compensating means for swinging the gang upon angular movement of the front frame, said means comprising a link having one end pivoted at a fixed point on the front frame and its other end connected to the gang through reverse motion mechanism.

2. In a disk harrow having front and rear flexibly connected frames and a disk gang pivoted on the rear frame, the combination therewith of a compensating device comprising a link having one end pivoted at a fixed laterally disposed point on the front frame, a rocking member on the rear frame having oppositely directed arms, a connection between one of said arms and the link and a connection between the other arm and said gang.

3. In a disk harrow having front and rear flexibly connected frames and a pivoted gang on the rear frame, the combination therewith of a compensating device comprising a rock shaft journaled on the rear frame having oppositely directed arms, a link pivotally connecting one of said arms with the gang, a lever pivoted intermediate its ends on the other of said arms, and connections between each end of said lever and the front frame.

4. In a disk harrow having front and rear flexibly connected frames and a pivoted gang on the rear frame, the combination therewith of a compensating device comprising a rock shaft journaled on the rear frame having oppositely directed arms, a link pivotally connecting one of said arms with the gang, a lever pivoted intermediate its ends on the other of said arms, a link connecting one end of said lever with the front frame and an adjusting rod connecting the other end of said lever with gang adjusting means on the front frame.

5. A disk harrow comprising front and rear frames, a pair of disk gangs pivoted on the rear frame, a pair of crossed links pivotally connected to said front frame at laterally spaced points, connections between said links and the gangs respectively, and a flexible draft coupling between the frames having an axis of movement at a point permanently located between the connecting points of the links to the front frame.

6. A disk harrow comprising front and rear frames, a pair of disk gangs pivoted on the rear frame, a central flexible coupling between the frames, a pair of rocking members mounted on the rear frame each provided with upper and lower arms, links connecting the lower arms to the gangs respectively, levers pivoted intermediate their ends on each of the upper arms, links connected to said levers at one end and pivoted to the front frame on each side of said flexible coupling, a pivotal connection between the other ends of said levers, and an adjusting rod connecting said other ends of the levers with adjusting means on the front frame.

7. A disk harrow comprising front and rear frames, a pair of disk gangs pivoted on each side of the rear frame, a pair of independent links pivotally connected at one end to the front frame at laterally spaced points, said links being crossed and connected at their other ends with the gangs respectively, and flexible coupling means connecting the frames.

8. A disk harrow comprising front and rear frames, a pair of disk gangs pivoted on each side of the rear frame, a pair of aligned rock shafts journaled on the rear frame, arms on said shafts connected to the inner ends of the gangs respectively, upright arms secured to the inner ends of the rock shafts, crossed links pivotally connecting the upper ends of said arms with laterally spaced points on the front frame, and a flexible coupling between said frames located between said links.

9. A disk harrow comprising front and rear frames, disk gangs pivoted on the rear frame on each side of the longitudinal median line of the frames, and flexible connections between the frames including crossed link compensating means acting on said gangs when said frames move out of alignment and operating to increase the angular adjustment of the gang on one side and decrease that on the other thereby tending to keep the rear frame in true trailing relation.

10. A disk harrow comprising front and rear flexibly connected frames, disk gangs pivoted on the rear frame on each side of the longitudinal median line of the frames, gang angling mechanism and separately operable means for automatically varying the angular adjustment of the gangs when said frames move out of alignment comprising links attached to the front frame and connected to the inner ends of the gangs through reverse motion mechanism.

11. In a double disk harrow, the combination of a front section comprising a pair of pivoted disk gangs, a rear section comprising a frame centrally pivoted to the front section for horizontal movement, a pair of pivoted disk gangs on said frame, and means for automatically altering the angles of the rear gangs during a change in the direction of travel of the harrow comprising two rearwardly converging bars pivotally connected at their forward ends to the front section at fixed points spaced outwardly on opposite sides of the pivot between the sections, and a connection between the rear end of each bar and the inner end of one gang on the rear section for transmitting movement of said bars to said gangs.

In testimony whereof I affix my signature.

ARTHUR ALFRED SCARLETT.